United States Patent
Müller et al.

(10) Patent No.: US 6,179,327 B1
(45) Date of Patent: Jan. 30, 2001

(54) ROLL BAR

(75) Inventors: Hartwig Müller, Chemnitz; Robert Schweier, Neukirchen, both of (DE)

(73) Assignees: Blechformwerke Bernsbach GmbH, Bernsbach; ISE Innomotive Systems Europe GmbH, Begeneustadt, both of (DE)

(*) Notice: Under 35 U.S.C. 154(b), the term of this patent shall be extended for 0 days.

(21) Appl. No.: 09/298,094

(22) Filed: Apr. 22, 1999

(30) Foreign Application Priority Data

Apr. 22, 1998 (DE) .......................................... 298 07 322 U
Mar. 30, 1999 (EP) .................................................. 99106477

(51) Int. Cl.$^7$ .................................................. B60R 21/13
(52) U.S. Cl. ............................................................ 280/756
(58) Field of Search .............................................. 280/756

(56) References Cited

U.S. PATENT DOCUMENTS 4,202,565 * 5/1980 Mosch ................................... 280/756
4,594,275 * 6/1986 Stolz ..................................... 280/756
4,673,190 * 6/1987 Ahlberg ................................ 280/756

FOREIGN PATENT DOCUMENTS

| 20 62 446 | 7/1972 | (DE) . | |
| 2409076 | * 8/1975 | (DE) | ..................................... 280/756 |
| 454279 | * 10/1991 | (EP) | ..................................... 280/756 |
| 0 676 316 | 10/1995 | (EP) . | |
| 2 076 402 | 10/1971 | (FR) . | |
| 1 213 476 | 11/1970 | (GB) . | |
| 2 047 180 | 11/1980 | (GB) . | |

* cited by examiner

Primary Examiner—Eric Culbreth
(74) Attorney, Agent, or Firm—Armstrong, Westerman, Hattori, McLeland & Naughton

(57) ABSTRACT

A roll bar for vehicles, in particular for topless motor vehicles, which can be fixedly or retractably attached to the vehicle. The roll bar is of a shell type construction having at least one main substantially flat surface provided with shaped convex portions having shape, size and geometrical arrangement to withstand a plurality of different load directions and/or kinds of load acting on it in the event of an accident.

4 Claims, 8 Drawing Sheets

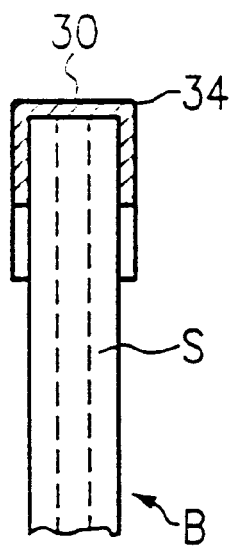
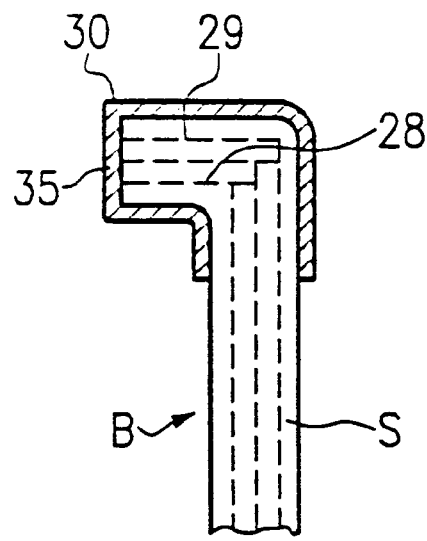
FIG.11A         FIG.11B
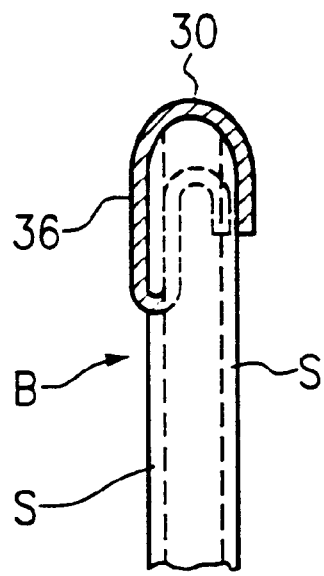
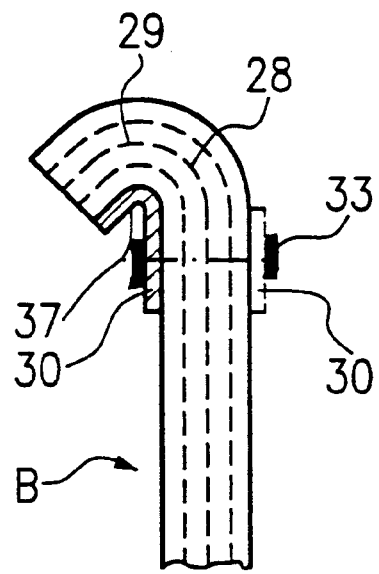
FIG.12A         FIG.12B

ROLL BAR

BACKGROUND OF THE INVENTION

1. Field of the Invention

The present invention refers to a roll bar of the kind provided on topless road vehicles for protecting vehicle occupants.

2. Description of Related Art

Roll bars for protecting vehicle occupants in the case of a roll-over accident are known not only in the field of motor racing but also for topless road vehicles or convertibles (cabriolet or roadster). The roll bar can be associated with only one vehicle occupant or, bridge the width of the vehicle, to protect two occupants sitting side by side. The roll bar is either fixedly installed or it is abruptly raised into position and locked in place in a critical driving situation. Known roll bars consist of a U-shaped hollow tube made of steel or light metal and having fastening points formed thereon. Load limits up to which the roll bar has to resist are predetermined by motor vehicle manufacturers for specific and typical cases of load and load directions. The main types of loads are a pressure-load acting on an apex region from above and a bending-load acting transversely to a plane defined by the roll bar. Fracture resisting requirements for the bending-load is normally less than half the fracture resisting requirements for the pressure-load. When the known roll bars, consisting of a metal tube, fulfill the bending-load requirements, they are unnecessarily oversized, approximately by a factor of two for the pressure-load requirements. Furthermore, the known tubular roll bars are heavy. The high weight requires a stable fastening to the vehicle body or, in the case of a retractable roll bar, a powerful retraction driving mechanism. In cases where the cross-section of the tube is opened by abrasion, due to the fact that the vehicle slides on the roll bar, the load requirements are no longer fulfilled.

SUMMARY OF THE INVENTION

It is the object of the present invention to provide a roll bar of the type to protect occupants of a topless road vehicle which is substantially less heavy than known roll bars and whose structural design is load-oriented without being over-dimensioned for one type of load.

According to the present invention, this object is achieved by turning away from the tubular construction and using a shell construction with unitary convex portions in a substantially flat main surface which makes it possible to provide the roll bar with an optimum load-oriented structural design, and a substantial amount of weight reduction in relation to tubular roll bars. Materials which are suitable for the roll bar of the shell-construction type are, preferably, a fibrous composite material of the kind being generally used e.g. in the field of motor racing; and also sheet steel, light-metal sheets or some other planar composite material. Modern manufacturing techniques in combination with FEM calculation of anticipated forces permit an exact load-oriented formation of the roll bar, i.e. the roll bar can be adapted to the requirements made by motor vehicle manufacturers with regard to the pressure loads and bending loads, without any necessity of over-dimensioning one of said loads. When the advantages of shell construction are utilized consistently, a substantial amount of weight is saved, whereby it is possible to use a simpler fastening means to the vehicle which is less heavy.

The roll bar is implemented as a one-piece either single-shell component or double-shell component, with the load requirements being fulfilled in an optimum manner by the convex portions formed in the shell.

The convex portions of the main substantially flat surface of the shell are adapted to load assumptions from the very beginning, e.g. by FEM calculations with material characteristics, material thicknesses or the like. The shell comprises only the amount of material which is necessary for the respective loads, i.e. a maximum amount of weight is saved.

Some motor vehicle manufacturers prescribe that, in the case of an accident in which the vehicle, when rolling over, slides on the roll bar, the requirements with regard to pressure and bending loads still have to be fulfilled when abrasion occurs due to sliding friction. This requirement is fulfilled for the shell-construction roll bar by an upper abrasion zone, and/or by anti-attrition inserts. In this connection, it is preferred to provide the abrasion zone of the shell as an energy-absorbing deformation area and to attach an anti-attrition insert to the top, if desired, or, better, to provide such an insert below the abrasion zone so that it is not directly exposed to the impact forces from the very beginning of an accident involving sliding.

Up to 50% or more of the weight of a shell-construction roll bar which is as efficient as a tubular roll bar can be saved when said shell-construction roll bar consists of a fibrous composite material. Fibrous composite materials can be processed easily and in an ecologically harmless manner and they can be reused later on. Glass fibers, carbon fibers or aramid fibers, with weft and warp threads in the layers of fabric, are excellently suitable materials. Plastic matrix may consist of a thermoplastic or a duroplastic material. Polyamide or PET are particularly suitable for this purpose. It is also possible in practice of the invention to use a metal foam as a matrix for fixing the layers of fabric. Thermoplastic materials have the additional advantage of being specially abrasion-resistant because these materials partially plasticize under the influence of friction (heat) and a lubricating effect is produced.

An easy and highly true-to-shape production of the roll bar is possible, even in the case of difficult cross-sectional shapes, by thermal forming, e.g. pressing under the influence of heat.

Edge regions of the shell contribute to the reinforcement of the roll bar, provided that they are implemented as convex portions. Flanges formed on said edge regions serve to connect the shells in the case of a multi-shell roll bar.

Convex portions formed in the main substantially flat surface serve to optimize absorbsion of loads on the roll bar, the cross-section, orientation and shape of said convex portions are optimized in an expedient manner by FEM calculations precisely with respect to load assumptions.

The convex portions are provided with shapes guaranteeing that, using a minimum amount of material, loads are distributed and taken up uniformly and transmitted in a predetermined manner to points of support in the vehicle body.

An intentional symmetry or asymmetry of the convex portions relative to a central vertical plane of the roll bar contributes to optimize the load transmittal. In this respect, it should be pointed out that the roll bar can be implemented for taking up pressure centrally, approximately at right angles to the central plane of the roll bar, or for a load direction inclined at an oblique angle from above the center of the vehicle.

In the preferred production technology the convex portions are pressed into the substantially flat main surface from the same side of said main surface; this is especially preferred for a roll bar consisting of two shells. In the case of a single-shell roll bar it would be possible in practice of the invention to press the convex portions into the substantially flat main surface, alternately or in groups, from different sides of said main surface so as to increase the stability by means of a broader overall cross-section.

An abrasion zone is provided in an apex region of the shell, said abrasion zone being adapted to be consumed by an abrasion load without impairing the load capacities of the roll bar for the main loads described above. Alternatively, at least one insert of an anti-attrition material can be provided on or in the roll bar.

For optimizing the load absorbing capacity of the roll bar, it is preferred to orientate weft and/or warp threads in the layers of fabric in relation to the main load directions so as to achieve a specific load absorbing behavior.

In order to conceal the technical character of the roll bar and/or in order to improve vehicle-occupant protection, an elastic cover can be provided for the roll bar.

When the shell-construction roll bar of the invention is used, fastening means for securing the roll bar in position in the vehicle can be taken into account and the increased stability or stiffness which can be achieved by use of the convex portions can be utilized in an expedient manner.

The substantially flat main surface can also have formed therein apertures for decorative or other reasons; said apertures should be formed in areas where little stress occurs under load.

BRIEF DESCRIPTION OF THE DRAWINGS

Embodiments of the present invention are explained in more detail below making reference to the following drawings, in which:

FIGS. 11A and 11B show cross sections through further embodiments of anti-attrition inserts of FIG. 9;

FIGS. 12A and 12B show cross sections through yet further embodiments of anti-attrition inserts of FIG. 9;

DETAILED DESCRIPTION OF THE INVENTION

Figure 1:
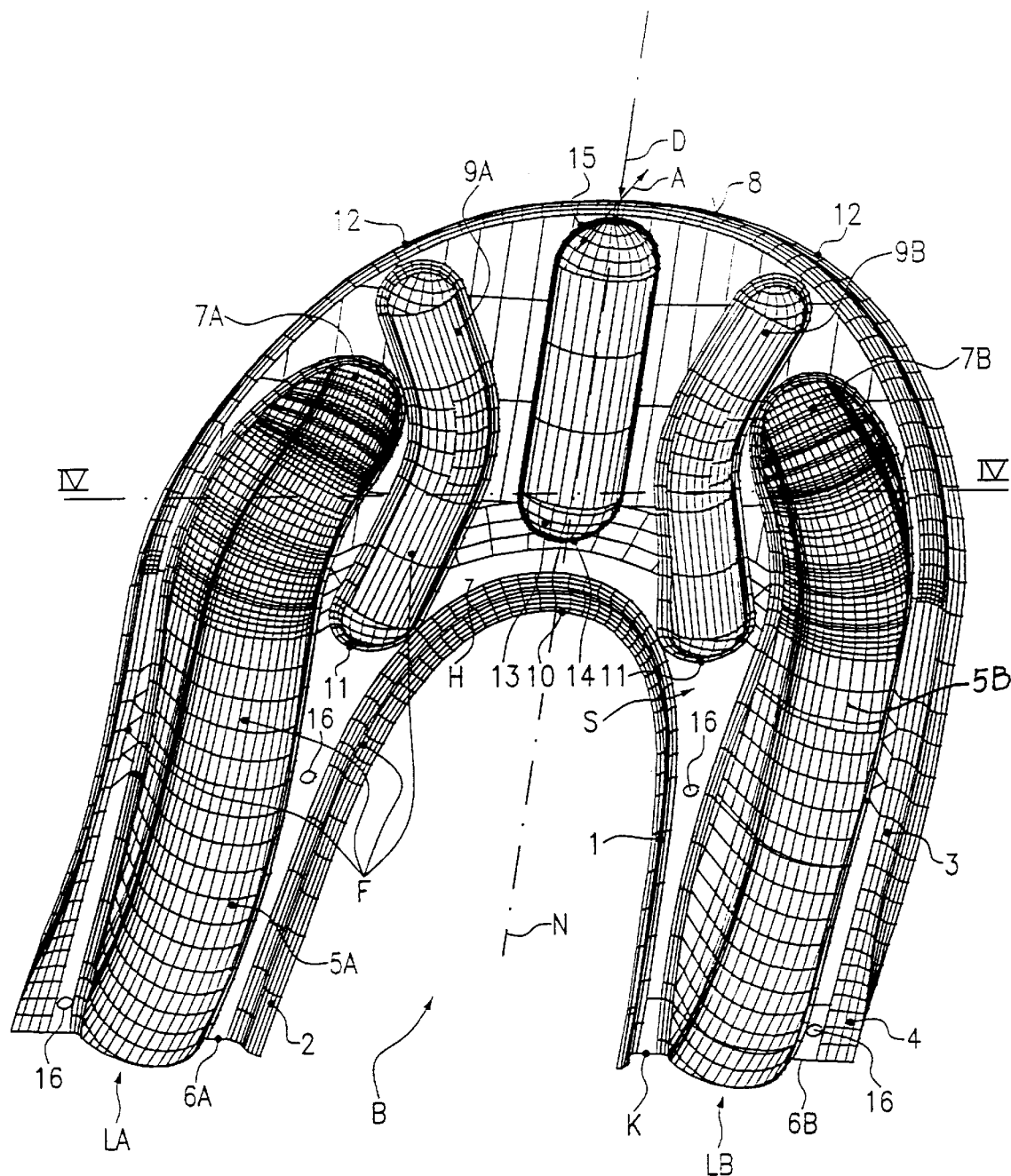
FIG. 1 shows a perspective schematic representation of a symmetric single-shell roll bar of the invention.

In FIG. 1, a shell construction roll bar B, which is substantially mirror-symmetrical with regard to a central plane N has a U-shaped configuration. Roll bar B in FIG. 1 is a one-piece shell S, which in a preferred embodiment consist of a fibrous composite material K (or in other embodiments of a sheet material or some other planar composite material), and is provided with a substantially flat main surface H delimited by an inner edge region 1, which terminates in a flange 2, and by an outer edge region 3, which terminates in a flange 4. Said substantially flat main surface H has shaped convex portions F formed therein so as to impart the necessary strength to the roll bar B. Apex region 8 of the roll bar B is, for example in an accident, subjected to a vertical pressure load D essentially in a direction along said substantially flat main surface H. Said vertical pressure load is effective also approximately along the central plane N. The roll bar can also be subjected to bending moments effective in the direction of double arrow A. In both cases of pressure and bending loads, the roll bar B must resist up to certain load limits.

The shaped convex portions F formed in the substantially flat main surface H of shell S are the edge regions 1 and 3 with their flanges 2, 4, which have already been mentioned, and a plurality of convex portions 5A, 5B, 9A, 9B, and 13 which are all formed into the substantially flat main surface H from the same side of said main surface H in a preferred embodiment and which, at least in such embodiment of FIG. 1, are distributed in a substantially mirror-symmetrical arrangement with regard to central plane N. In each leg $L_A$ and $L_B$ of the roll bar B a comparatively deep and broad convex portions (5A and 5B) having a semicircular cross-section begins at leg end 6A or 6B and extends along the outer edge region 3 up to and beyond the level of an inner bend 10 in the direction toward the apex region 8, and ends within the edge region 3 at 7A or 7B. Further convex portions 9A and 9B near the top of each leg is bent at an obtuse angle and a lower end 11 thereof extends into a V-shaped area between the convex portions 5A or 5B and the inner edge region 1 below the inner bend 10. An upper end 12 of each convex portions 9A and 9B is located within the outer edge region 3 and the inner bend 10, on a higher level towards apex region 8 than the ends 7A or 7B of the convex portions 5A and 5B. Ends 7A and 7B of convex portions 5A and 5B are located at the bend of convex portions 9A and 9B, said convex portions 9A and 9B extending first at an oblique angle upwards towards the central plane N and then, along a rounded curve, away from central plane N at an oblique angle outwards. The convex portions are arranged on both sides of central plane N. Between convex portions 9A and 9B, a central, essentially straight convex portion 13 is provided whose lower end 14 is located approximately above the inner bend 10 and whose upper end 15 is located close to the outer edge region 1 of the apex region 8. The edge regions 1 and 3 are curved away from the substantially flat main surface H in a round, equidirectional curvature. Main surface H has formed therein a plurality of fastening points 16. The main surface H may also have formed therein at least one free aperture (not shown).

It is preferred that the fibrous composite material K from which the one-piece shell S is formed consist of so-called prepegs, i.e. layers of fabric impregnated with a plastic material with such fabric consisting of glass fibers, carbon fibers or aramid fibers, which are interwoven as weft threads and warp threads. Shell S according to FIG. 1 is formed as a unitary shell from a substantially flat shell blank e.g. in a heated pressing mould under the influence of pressure and temperature acting on the shell blank which is preheated. The shell blank can consist of several layers if desired. Due to the pressing, the layers of fabric are embedded into a plastic matrix, and the configuration with convex shaped portions F in the main substantially flat surface H, which can be seen in FIG. 1, is obtained. The main surface H is substantially flat. It is, however, possible to carry out the process of the invention by imparting a spatial curvature to said main surface H in one direction or the other, as outlined by the network of lines in FIG. 1.

Figure 2:
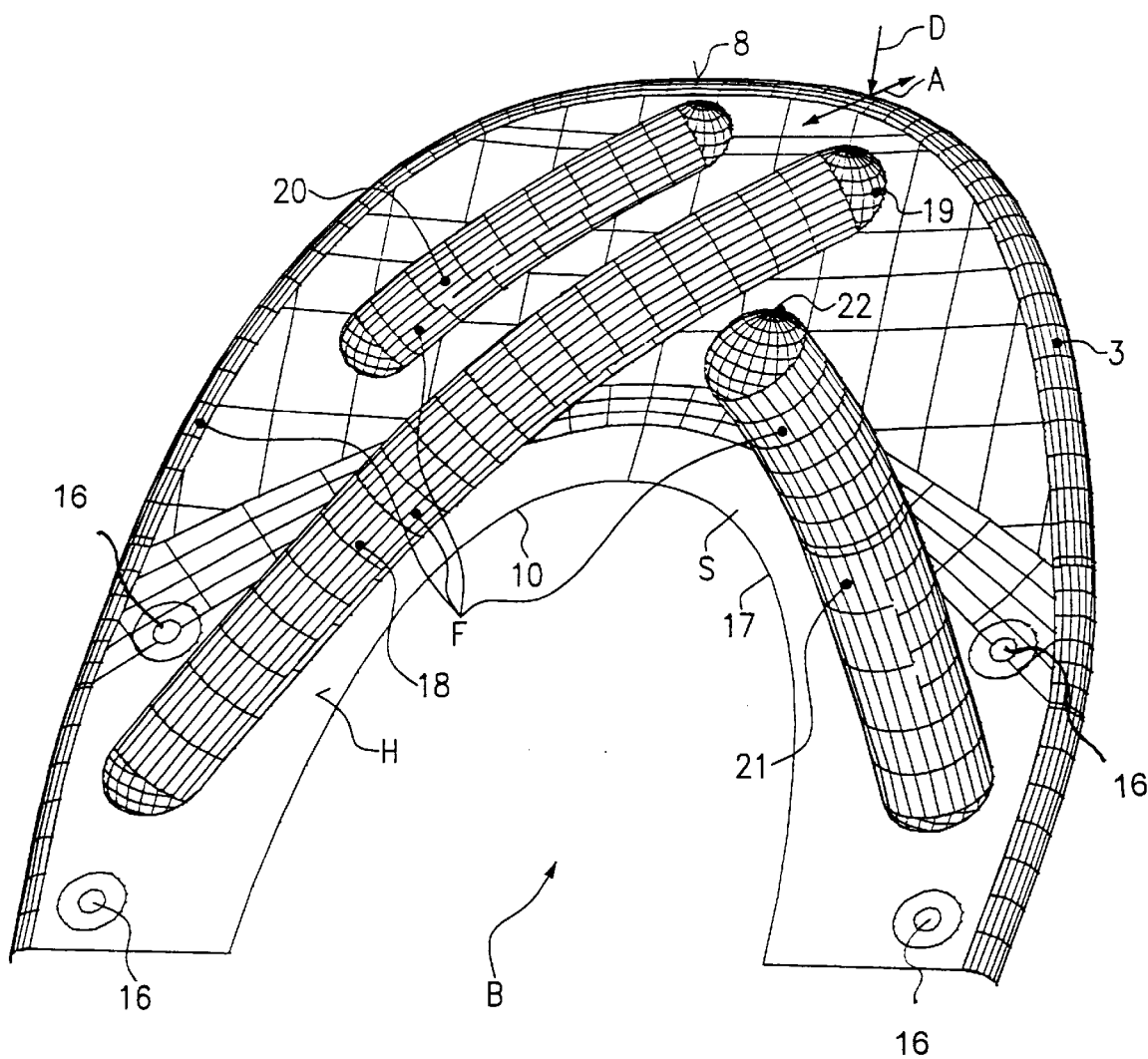
FIG. 2 shows a perspective schematic representation of an asymmetric single-shell roll bar of the invention.

In FIG. 2 an asymmetric roll bar B (or a symmetric roll bar B with an asymmetric load bearing behavior) is depicted. The convex portions F of the one-piece shell S are essentially three slightly curved convex portions 18, 20 and 21 and outer edge region 3 which is rounded. In the area of inner bend 10, an inner edge 17, which becomes increasingly flat is indicated. The inner edge region 1 according to FIG. 1, is curved relative to the substantially flat main surface H, and such type curve can be provided in the case of this embodiment, (FIG. 2), as well. The main surface H has formed therein two fastening points 16 per leg of the roll bar B; if desired, these fastening points 16 may be provided with hole reinforcements, which can be integrated in the main surface H or formed relative thereto. The longest of the three convex portions, 18, extends between the two other convex portions and begins at a left lower leg, passes inner bend 10, and extends towards apex region 8 in such a way that it is approximately oriented towards a point of introduction of vertical pressure load D (asymmetrical introduction of pressure) and also towards an influence sphere of bending moments in the directions of double arrow A. Convex portion 18 is slightly curved around the inner bend 10. In a sickle shaped area between the convex portion 18 and the outer edge region 3 in the left leg of the roll bar B a convex portion 20 begins and extends substantially parallel to convex portion 18 and is also oriented towards apex region 8. A third convex portion 21 begins in the right leg between the fastening points 16, extends around the inner bend 10 with a slight curvature and ends at a small distance from convex portion 18 at 22, said convex portion 21 and said convex portion 18 define an angle of approx. 80°.

Figure 3:
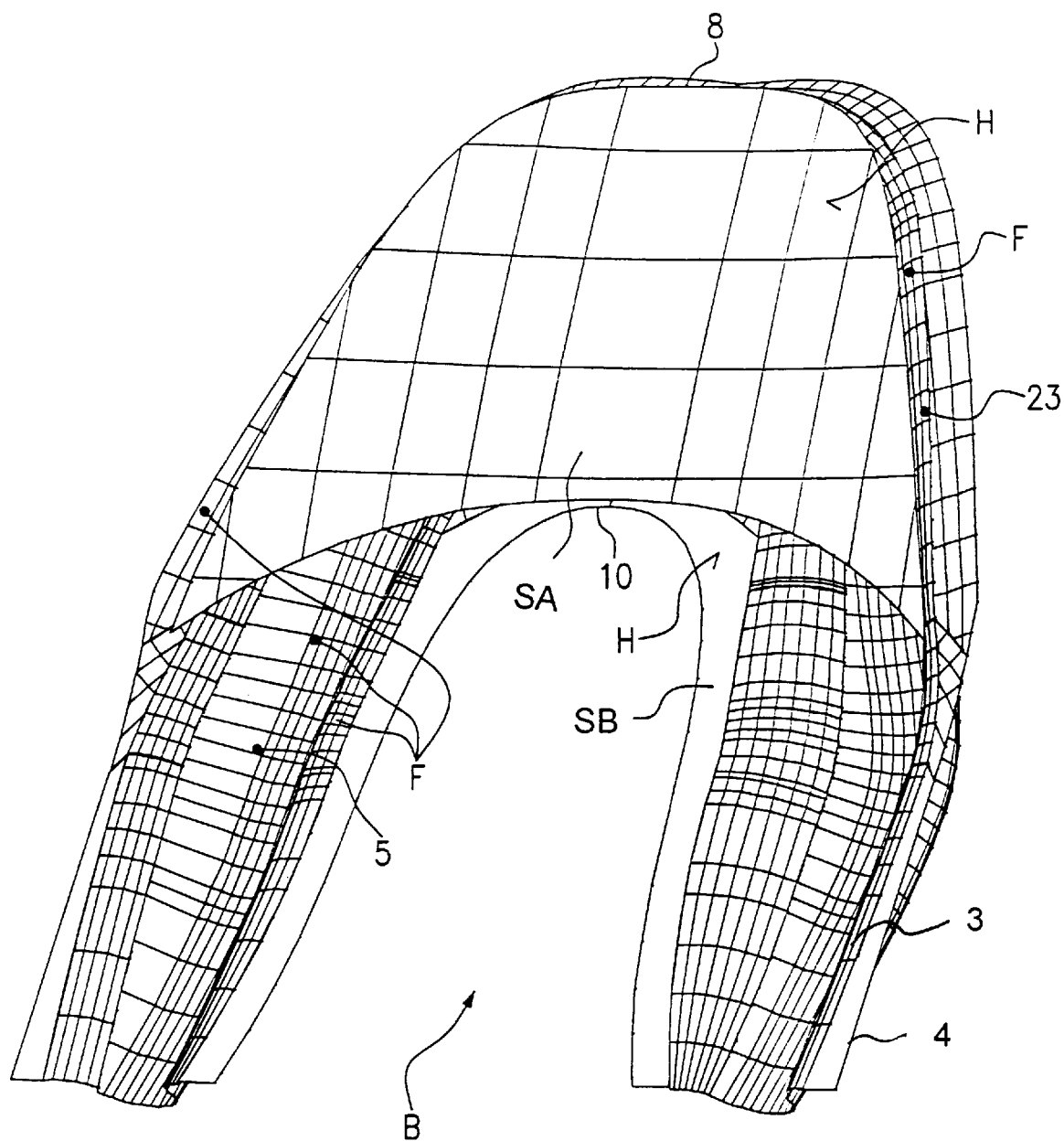
FIG. 3 shows a perspective schematic representation of a two-shell roll bar of the invention.

Roll bar B in FIG. 3 is produced from two shells $S_A$ and $S_B$ of fibrous composite material K which are e.g. joined by an adhesive with shell $S_A$ covering the area of the lower shell $S_B$ between inner bend 10 and apex region 8. Each shell, $S_A$, $S_B$, has a main surface H and shaped convex portions F. In the case of the upper shell $S_A$, said convex portions F are essentially only the bent outer edge region 23 which terminates in a flange that is connected to flange 4 of outer edge region 3 of the lower shell $S_B$. The lower shell $S_B$ has shaped convex portions F which are similar to those provided in the embodiment of the shell S of FIG. 1. Convex portions 5, which are formed in the main surface H of shell $S_B$, can be seen in FIG. 3.

Figures 4A, 4B, 4C:
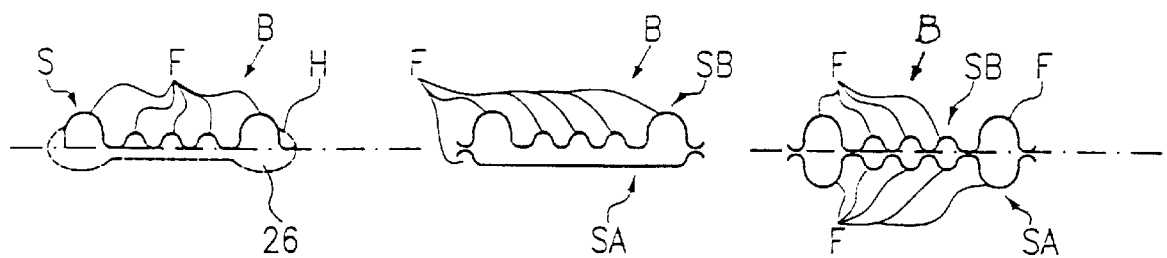
FIG. 4A shows a cross-sectional configuration for a single-shell construction of the roll bar of the invention.
FIGS. 4B and 4C show a cross-sectional configuration for two-shell construction of the roll bar of the invention.

FIGS. 4A, 4B and 4C are outlines of embodiments of the roll bar in planes as indicated in FIG. 1 at IV—IV, that is slightly above inner bend 10 of the embodiments. FIG. 4A is a single-shell component with shaped convex portions F formed in the main surface H of the shell S. In FIG. 4B the roll bar is a double-shell component consisting of shell $S_B$ provided with the shaped convex portions and of another shell $S_A$ which is deformed only in the edge region (two-shell construction). In FIG. 4C the roll bar consists of two shells $S_A$ and $S_B$ which are either implemented symmetrically (as in the case of FIG. 1) or non-symmetrically, both shells $S_A$ and $S_B$ being, provided with shaped convex portions F. In the case of the two-shell construction, the shells can be joined by an adhesive or welded together. In FIG. 4A it is indicated that roll bar B has a protective and/or decorative cover 26 of plastic material, foam material or the like.

Figures 5, 6:
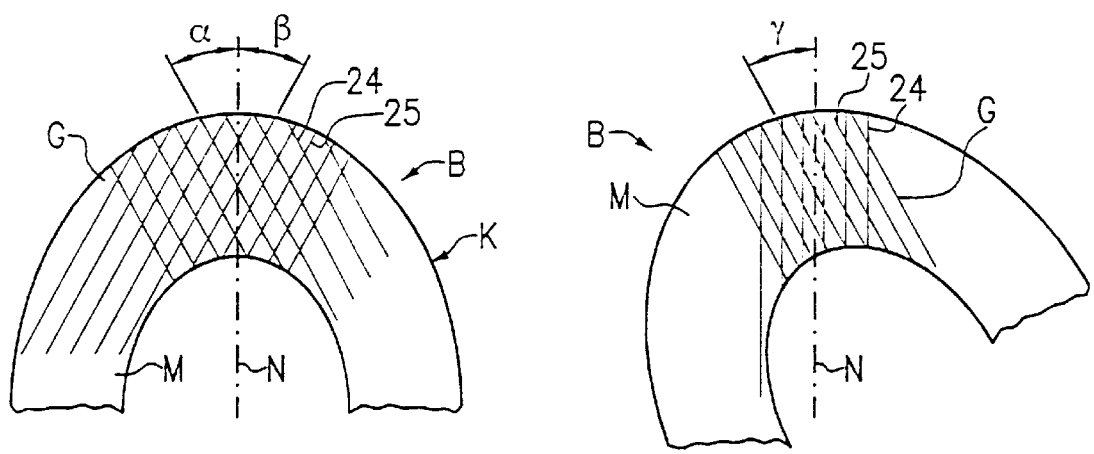
FIGS. 5 and 6 show respectively a front view of a symmetric and an asymmetric roll bar of the invention, each having a specific fiber orientation in layers of fabric.

FIG. 5 indicates that layers of a fabric G in a plastic matrix M contain weft and warp threads 24, 25 which extend at oblique angles $\alpha$, $\beta$ relative to the central plane N (see FIG. 1) so that the forces on the roll bar are taken up in an optimum manner. The angles $\alpha$ and $\beta$ range from 20 to 40°, and preferred value for said angles is approx. 25°.

FIG. 6 shows a roll bar B which is asymmetrical with respect to a plane N which extends approximately vertically in a vehicle body. Weft and warp threads 24, 25 of the layers of fabric G or of at least of one layer of fabric are oriented such that an angle $\gamma$, which is approx. 25°, is obtained between the weft threads and the central plane N, and the warp threads extend approximately parallel to plane N. The angles indicated in connection with FIG. 5, 6 are only examples. The essential point is that the force take-up behavior of the roll bar B can be influenced by the orientation of the weft and/or warp threads relative to force introduction directions. It is possible in carrying out the invention to choose identical thread orientations or different thread orientations in each layer of fabric G.

Figure 7:
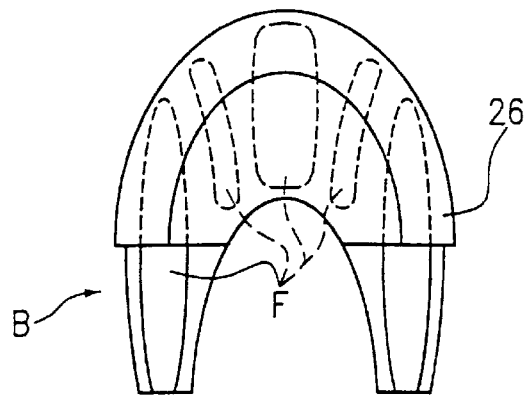
FIG. 7 shows a front view of a roll bar of the invention provided with a cover of foam material.

In FIG. 7 roll bar B is shown with a cover 26 (foam padding, upholstery or elastomer) with an outer bead. The legs of the roll bar B are secured to the vehicle body or connected to a drive means (not shown) for retracting the roll bar B or for pivoting it to an upright position. The cover 26 covers most of a possibly untreated surface (for aesthetic reasons, for protecting the vehicle occupants, or as a protection against atmospheric effects).

Figures 8A, 8B:
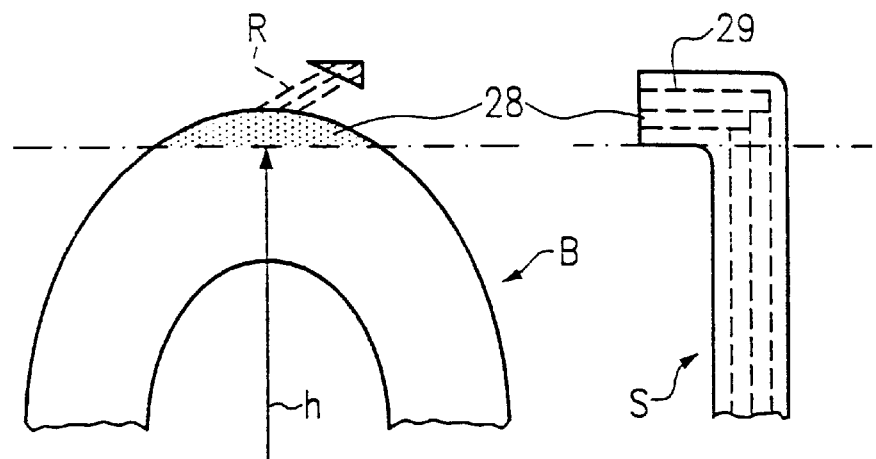
FIGS. 8A and 8B show respectively a front view and an associated side view of a shell-construction roll bar of the invention provided with an abrasion zone.

FIGS. 8A and 8B illustrate an abrasion zone 28 provided above a predetermined supporting height h of roll bar B, which is preferably formed of a fibrous composite material as a shell-construction component; under the influence of friction forces R (indicated by broken lines), abrasion zone 28 can be consumed without jeopardizing the pressure and bending-load absorbing properties of the roll bar B. In the associated side view FIG. 8B, it can be seen that the abrasion zone 28 can have a shaped structure 29 which is formed by a bend in the shell at 29 so as to be able to consume the largest possible amount of friction force and/or so as to serve as a deformation zone to be sacrificed.

Figures 9A, 9B:
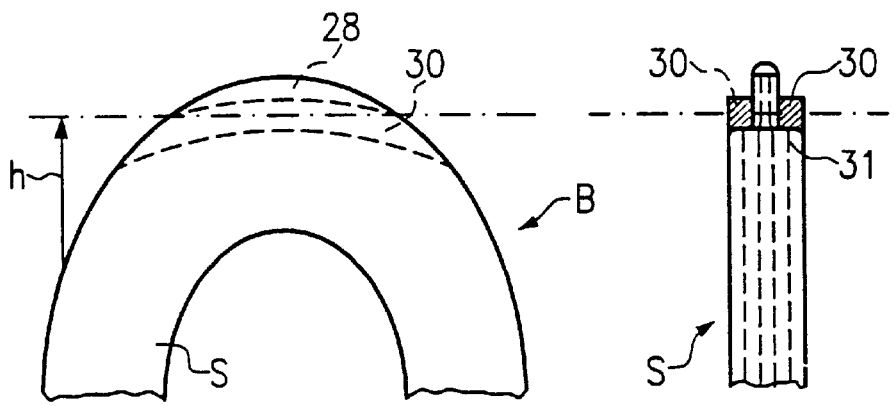
FIGS. 9A and 9B show respectively a front view and an associated cross-sectional side view of a shell-construction roll bar of the invention with anti-attrition inserts.

In FIGS. 9A and 9B it is indicated that shell S or two interconnected shells (FIG. 9B) of roll bar B have inserted at least one insert 30 of anti-attrition material, e.g. steel, ceramics, a braided fiber fabric, light metal or plastic material which slides well or which is equipped such that it has good sliding properties. The insert 30 may be integrated (embedded) in the shell S. It is also preferred that the insert 30 be positively secured in position on a shoulder 31 or in a pocket of the shell so that it will remain on said shell under the influence of abrasion and impact forces. It is possible in practice of the invention to provide such inserts at both outer sides of the roll bar—either a one-piece insert on each side or a plurality of individual inserts so as to save weight. The insert 30 should be provided on a slightly lower level (as shown in FIGS. 9A and 9B) so that it will only become effective after the abrasion zone is worn away and so that it will not be directly exposed to the impact force of the ground from the very beginning in event of an accident.

Figures 10A, 10B:
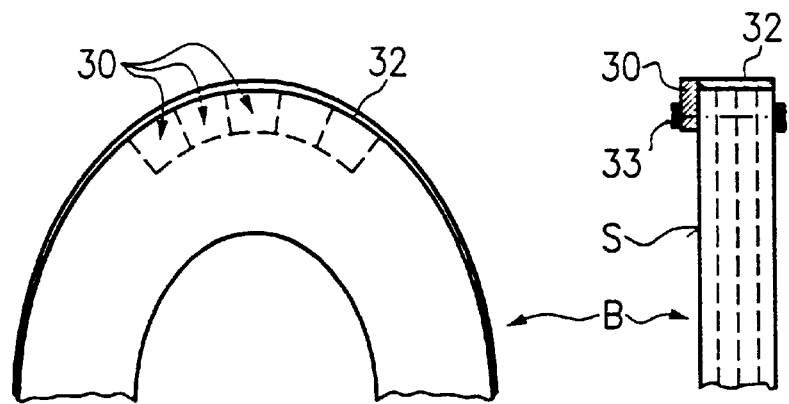
FIGS. 10A and 10B show respectively a front view and an associated cross-sectional view of a further embodiment of the anti-attrition inserts of FIG. 9.

FIGS. 10A and 10B illustrate an insert 30 attached, e.g. by means of rivets 33; to at least one outer side of roll bar B, or several inserts, which are separated by intermediate spaces. At top edges, the inserts can be covered by a decorative cover 32 or a cover 32 having good sliding properties, or they may be covered by the abrasion zone 28 outlined in FIGS. 8A and 8B.

FIGS. 11A and 11B show cross-sectional views of shells of roll bar B in which insert 30 is put over the shell (in apex region 8) in the fashion of a cap 34 having a U-shaped cross-section (FIG. 11A) or with abrasion zone 29, 28 (see FIG. 8) combined with a cap 35 defining insert 30.

In FIGS. 12A and 12B, two further embodiments of securing an anti-attrition insert 30 in position on shell S of roll bar B are indicated. In the representation of FIG. 12A, insert 36 encompasses the apex region of the roll bar like a cap and one supporting leg thereof extends inwards through a wall so that the insert will not come off under load. This is a fastening mode which is preferred for a roll bar consisting of two shells. In the representation of FIG. 12B, a sacrificial abrasion zone 29 is combined with insert 37, which is inserted in an inner bend of the shell below the abrasion zone, said insert 37 fits closely to the round corner and is held therein e.g. by rivet connection 33 so that said insert cannot separate itself from the shell S under load.

With such shell construction, a load-adapted geometric structural design of various roll-bar concepts can be achieved. Also in the case of bending forces, the structural design is adapted to the bending moments in question, oversized dimensions for the vertical pressure load being avoided. The production of each shell need not necessarily be carried out by thermal forming (pressing) described above, as it is possible to use the laying-up, the RTM, the SMC method or other methods. Cover 26, e.g. a foam padding, outlined in FIG. 7 provides improved vehicle-occupant protection, e.g. in the case of blows to the head, and permits a desired optical or decorative effect to be achieved. The cover can have applied thereto a special top layer producing e.g. the optical effect of a carbon-fiber reinforcement. Fastening points 16 (FIGS. 1 and 2) can be reinforced by sheet-metal elements so as to reduce compression and to improve the distribution of forces in the roll bar. In comparison with tubular roll bars, the shell geometry can be optimized precisely by means of its shaped convex portions with regard to the anticipated loads. The weight of the roll bar consisting of the fibrous composite material K is only approx. 1.2 kg, whereas a typical steel-tube roll bar has a weight of about 2.8 kg. In the case of roll bars that can be folded down or pivoted to an upright position, roll bars of the invention will result in shorter positioning times for the roll bar (more safety), and a drive mechanism for positioning the bar can be simplified and designed such that it is less heavy. The shells of the roll bar can more easily be incorporated into the design of the passenger compartment and of the skin of a vehicle from the structural as well as from the decorative point of view. Each shell can be designed comparatively freely under ergonomic and/or aesthetic aspects. When a steel-tube roll bar is used, abrasion can change and weaken the cross-sectional dimensions, whereby the fracture strength will be reduced substantially. In the case of roll bars having the structural design described in the present application, abrasion does not have any significant influence on the fracture strength. Shell construction can also be used for roll bars bridging the whole width of the vehicle as well as solely one occupant. In this case, it may, however, be expedient to produce the roll bar by combining a plurality of separately produced shell components or/and tubular components. The energy absorption behavior is predeterminable and more advantageous than in the case of tubular roll bars because the impact occurring is less violent and less dangerous for the passengers because of the damped or delayed energy absorption.

Figure 13:
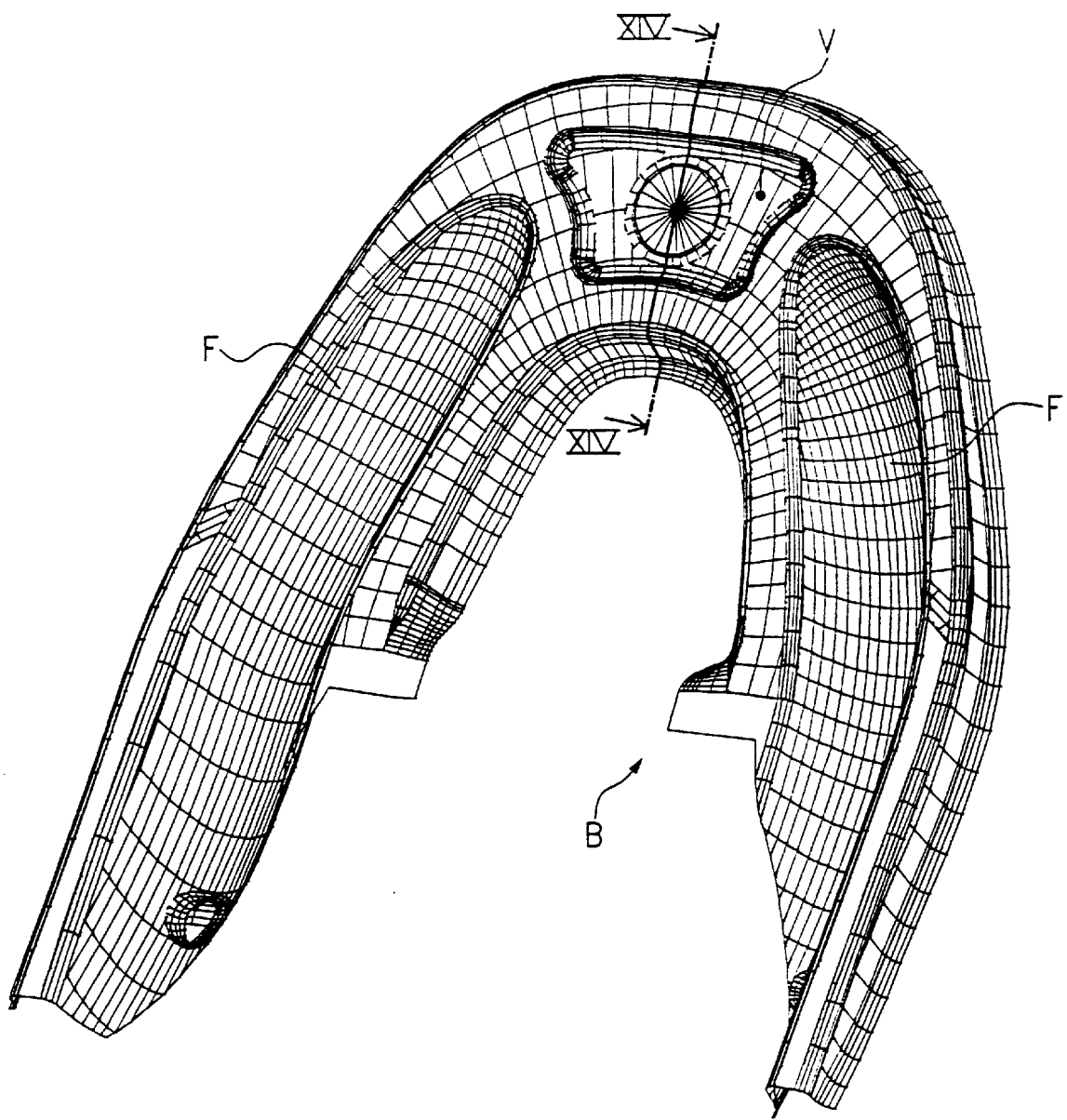
FIG. 13 schematically shows an embodiment of the invention in perspective having varying shell thicknesses.
Figure 14:
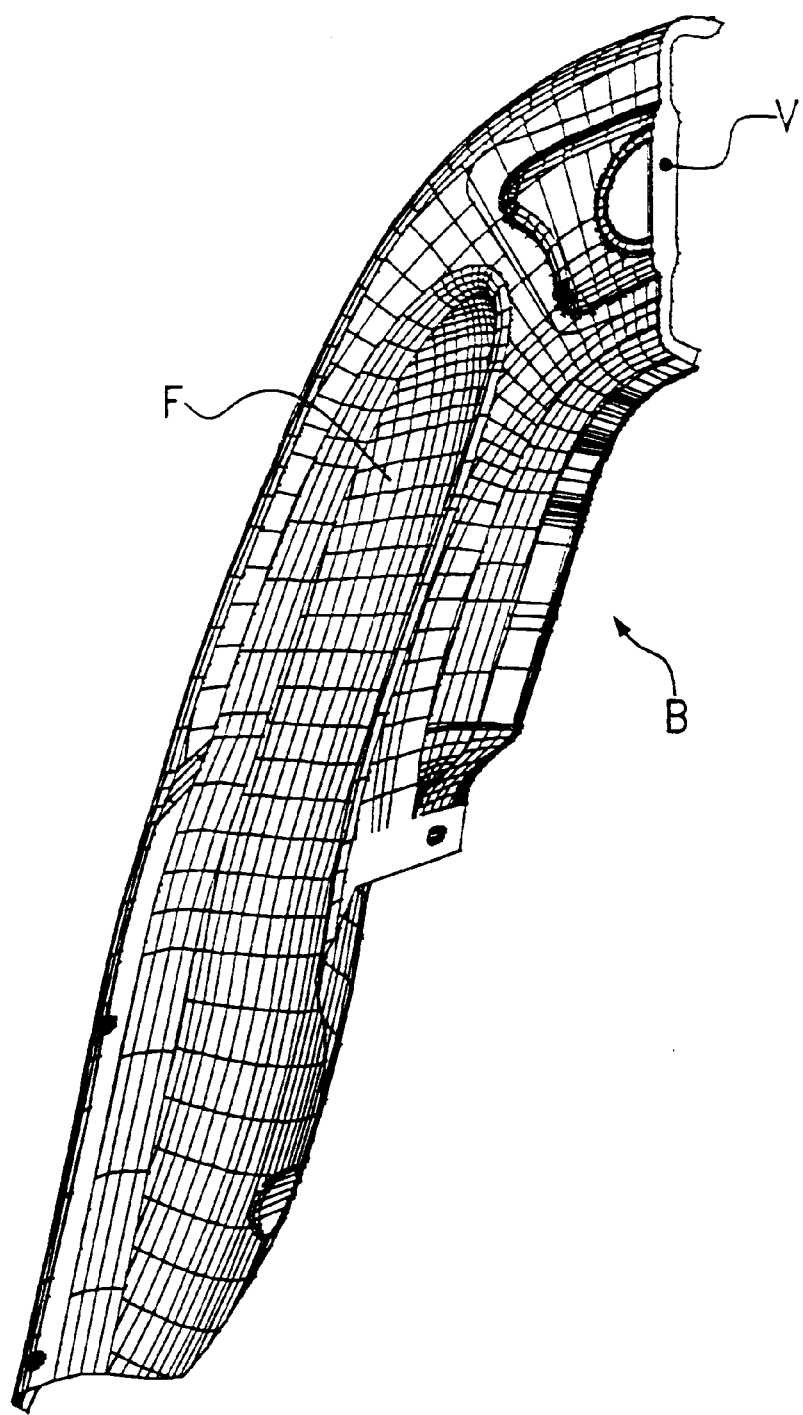
FIG. 14 shows a cross-sectional view of the embodiment of FIG. 13 taken along interrupted line XIV—XIV.

An embodiment of FIGS. 13 and 14 differs from the embodiment of FIG. 1 in that the three shaped convex portions having a central location have been omitted. In order to obtain sufficient stiffness in the embodiment illustrated in FIGS. 13 and 14, the wall thickness of the shell has been increased in the upper central portion of the roll bar, as indicated at V in FIGS. 13 and 14. FIG. 14 is a sectional perspective view of the embodiment of FIG. 13 with the section taken in a plane indicated by interrupted line XIV—XIV of FIG. 13.

What is claimed is:

1. A roll bar, for topless motor vehicles, to provide protection to a vehicle occupant from pressure, bending, and abrasion loads in event of an accident, comprising at least one shell having an inverted "U" shape with a substantially flat main surface parallel to a plane defined by the inverted "U" shape, at least one convex portion formed in said main surface, each said convex portion having a shape, size and geometrical arrangement adapted to absorb a portion of the loads encountered in event of an accident, said inverted "U" shaped shell having a top apex portion and two leg portions extending downwardly from said apex portion, an inner edge along an inside periphery of said top apex and legs, and an outer edge along an outside periphery of said top apex and legs, said at least one shell having a plurality of elongated convex portions with a rounded cross-section, with such convex portions being longitudinally directed toward the top apex portion with one longitudinal end of each elongated convex portion being within one of the edge portions of the shell.

2. A roll bar according to claim 1 wherein said elongated convex portions have a shape in a longitudinal direction selected from the group consisting of:

a) straight, b) curved, and c) an obtuse angle.

3. A roll bar, for topless motor vehicles, to provide protection to a vehicle occupant from pressure, bending, and abrasion loads in event of an accident, comprising at least one shell having an inverted "U" shape with a substantially flat main surface parallel to a plane defined by the inverted "U" shape, at least one convex portion formed in said main surface, each said convex portion having a shape, size and geometrical arrangement adapted to absorb a portion of the loads encountered in event of an accident, said inverted "U" shaped shell having a top apex portion and two leg portions extending downwardly from said apex portion, an inner edge along an inside periphery of said top apex and legs, and an outer edge along an outside periphery of said top apex and legs, said shell consisting of at least one layer of a fibrous composite material and at least one layer of woven fiber fabric embedded in a plastic matrix, said woven fiber fabric consisting of weft and warp threads selected from the group consisting of:
a) glass fibers,
b) carbon fibers,
c) aramid fibers, and
d) blends of any of the above,
said shell being asymmetrical and said warp threads being longitudinally oriented in a vertical direction.

4. A roll bar, for topless motor vehicles, to provide protection to a vehicle occupant from pressure, bending, and abrasion loads in event of an accident, comprising at least one shell having an inverted "U" shape with a substantially flat main surface parallel to a plane defined by the inverted "U" shape, at least one convex portion formed in said main surface, each said convex portion having a shape, size and geometrical arrangement adapted to absorb a portion of the loads encountered in event of an accident, said inverted "U" shaped shell having a top apex portion and two leg portions extending downwardly from said apex portion, an inner edge along an inside periphery of said top apex and legs, and an outer edge along an outside periphery of said top apex and legs, said apex portion of the shell being free of convex portions and of greater thickness than remaining portions of the shell.

\* \* \* \* \*

UNITED STATES PATENT AND TRADEMARK OFFICE
CERTIFICATE OF CORRECTION

PATENT NO.   : 6,179,327 B1
DATED        : January 30, 2001
INVENTOR(S)  : Hartwig Muller, Robert Schweier It is certified that error appears in the above-identified patent and that said Letters Patent is hereby corrected as shown below:

<u>Title page,</u>
Item [73], Assignees, should read --
Blechformwerke Bernsbach GmbH, Bernsbach;
ISE Innomotive Systems Europe GmbH, Bergneustadt,
both of (DE)

Signed and Sealed this

Twenty-fifth Day of December, 2001

Attest:

Attesting Officer

JAMES E. ROGAN
*Director of the United States Patent and Trademark Office*